(12) United States Patent
Rahman et al.

(10) Patent No.: US 10,893,694 B2
(45) Date of Patent: Jan. 19, 2021

(54) COMPOSITION REMEDY TO PREVENT SYMPTOMS RELATED TO EXCESSIVE ALCOHOL CONSUMPTION

(71) Applicants: Steve Rahman, Wellington, FL (US); Brent Blackman, Stuart, FL (US)

(72) Inventors: Steve Rahman, Wellington, FL (US); Brent Blackman, Stuart, FL (US)

( * ) Notice: Subject to any disclaimer, the term of this patent is extended or adjusted under 35 U.S.C. 154(b) by 28 days.

(21) Appl. No.: 16/562,831

(22) Filed: Sep. 6, 2019

(65) Prior Publication Data

US 2020/0305487 A1 Oct. 1, 2020

Related U.S. Application Data

(60) Provisional application No. 62/826,638, filed on Mar. 29, 2019.

(51) Int. Cl.
*A61K 36/00* (2006.01)
*A23L 33/105* (2016.01)
*A23L 33/175* (2016.01)
*A23L 29/30* (2016.01)
*A23L 29/00* (2016.01)
*A23L 33/15* (2016.01)

(52) U.S. Cl.
CPC .......... *A23L 33/105* (2016.08); *A23L 29/035* (2016.08); *A23L 29/045* (2016.08); *A23L 29/30* (2016.08); *A23L 33/15* (2016.08); *A23L 33/175* (2016.08)

(58) Field of Classification Search
CPC ..................................................... A61K 36/00
USPC ........................................................ 424/725
See application file for complete search history.

(56) References Cited

U.S. PATENT DOCUMENTS

2005/0181047 A1* 8/2005 Romero .............. A61K 9/5078
424/469

\* cited by examiner

*Primary Examiner* — Michael V Meller
(74) *Attorney, Agent, or Firm* — Goldberg Segalla

(57) ABSTRACT

An edible composition to increase the metabolism of alcohol thus prevent or lessen the symptoms caused by ingesting excessive amounts of alcohol is disclosed.

15 Claims, 2 Drawing Sheets

Edible Composition Preferred Embodiment Component Amounts

| Component | Amount (mg) | Type |
|---|---|---|
| *p*-synephrine | 50 | Alkaloid |
| N-methyl tyramine | 50 | Alkaloid |
| *N,N*-dimethyltyramine | 50 | Alkaloid |
| Methylxanthine | 350 | Alkaloid |
| L-theanine | 100 | Amino acid |
| Branch chain amino acids | 5,000 | Amino acid |
| N-acetyl tyrosine | 1,000 | Amino acid |
| 5-hydroxytryptophan | 15 | Amino acid |
| N-acetyl cysteine | 750 | Amino acid |
| Acetyl L carnitine | 750 | Amino acid |
| Yohimbine HCL | 10 | Plant extract |
| Vinpocetine | 25 | Plant extract |
| Green tea extract (45% Epigallocatechin gallate) | 75 | Polyphenol |
| Quercetin dehydrate | 250 | Polyphenol |
| Maltodextrin | 2,000 | Sugar |
| Magnesium glycinate | 100 | Electrolyte |
| Vitamin B complex | 2,000 | Vitamin |
| Dimethylethanolamine | 100 | Organic compound |
| Flavorant | ---- | ---- |
| Preservative | ---- | ---- |

FIGURE 1

Edible Composition Another Embodiment Component Amounts

| Component | Amount (mg) | Type |
|---|---|---|
| *p*-synephrine | 50 | Alkaloid |
| N-methyl tyramine | 50 | Alkaloid |
| Methylxanthine | 350 | Alkaloid |
| L-theanine | 100 | Amino acid |
| Branch chain amino acids | 5,000 | Amino acid |
| N-acetyl tyrosine | 1,000 | Amino acid |
| 5-hydroxytryptophan | 15 | Amino acid |
| N-acetyl cysteine | 750 | Amino acid |
| Acetyl L carnitine | 750 | Amino acid |
| Yohimbine HCL | 10 | Plant extract |
| Vinpocetine | 25 | Plant extract |
| Green tea extract (45% Epigallocatechin gallate) | 75 | Polyphenol |
| Quercetin dehydrate | 250 | Polyphenol |
| Maltodextrin | 2,000 | Sugar |
| Magnesium glycinate | 100 | Electrolyte |
| Vitamin B complex | 2,000 | Vitamin |
| Dimethylethanolamine | 100 | Organic compound |
| Flavorant | ---- | ---- |
| Preservative | ---- | ---- |

FIGURE 2

COMPOSITION REMEDY TO PREVENT SYMPTOMS RELATED TO EXCESSIVE ALCOHOL CONSUMPTION

CROSS-RELATED APPLICATIONS

This application claims priority of Provisional Application Ser. No. 62/826,638, filed Mar. 29, 2019, the contents of which are incorporated herein by reference.

FIELD OF THE INVENTION

The present invention relates generally to a formulation to prevent or lessen sickness suffered due to ingesting excessive amounts of alcohol.

BACKGROUND

Ingesting excessive amounts of alcohol typically results in the condition commonly known as the "hangover," classified by symptoms such as headache and lethargy. Traditional remedies include ingesting black coffee and taking cold showers, but these are often met with little success. Many different formulations for hangover remedies also exist such as Thrive, Right Stuff, After Party, Emergen-C, and Airborne. However, these remedies do not fix the hangover because they do not increase the metabolism of alcohol. In other words, the remedies address the symptoms, but do not address the cause of the symptoms. Alcohol thus remains in the system long enough to break down into acetylaldehyde, the toxic byproduct of alcohol which causes such symptoms.

In light of the foregoing, there exists a need for a safe, reliable method of preventing sickness suffered due to the excessive ingestion of alcohol such that these symptoms may be lessened or altogether avoided. Benefits from ingesting the composition disclosed herein include improved hangover symptoms, i.e. the lessening or complete elimination of headaches, dizziness, mental fog, and queasiness. Benefits also include the ability to function the following day, and the potential for the complete avoidance thereof of all hangover symptoms.

SUMMARY

The present invention solves one or more problems of the prior art by providing a safe, effective remedy to prevent and/or decrease symptoms from the excessive consumption of alcohol. The present invention may also be used to assist with symptoms caused by ADHD, high blood sugar, and narcolepsy. The present invention increases liver function by providing nutrients and stimulants; the invention also includes sugars and electrolytes to combat hypoglycemia and dehydration.

The composition of this embodiment includes alkaloids, sugars, amino acids, electrolytes, plant extracts, vitamins, stimulants, polyphenols, at least one preservative, and at least one flavorant in a sufficient amount to render the composition palatable. In one embodiment, the composition is pre-mixed with an edible fluid to form about 6 ounces to about 8 ounces of remedy. In another embodiment, the composition is administered as a dry powder, and mixed with about 6 ounces to 8 ounces of edible fluid of choice.

BRIEF DESCRIPTION OF THE DRAWINGS

The following detailed description of the preferred embodiment(s) of the present invention will be better understood when read in conjunction with the appended drawings. The present invention is illustrated by way of example, and not limited by the accompanying figures, in which like references indicate similar elements.

FIG. 1 is a table illustrating the preferred embodiment of component amounts of the present invention.

FIG. 2 is a table illustrating another embodiment of component amounts of the present invention.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. It is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

All numerical quantities in this description indicating amounts of material or conditions of use are to be understood as modified by the word "about" in describing the broadest scope of the invention. Practice within the numerical limits stated is generally preferred. Also, unless expressly stated to the contrary: the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym, in parentheses after the full chemical name, or other abbreviation applies to all subsequent uses herein of the same abbreviation and applies mutatis mutandis to normal grammatical variations of the initially defined abbreviation.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The dosage ranges for the administration of the compositions are those large enough to produce the desired effect in which the symptoms of the hangover are effected. The dosage should not be so large as to cause adverse side effects, which may include sleeplessness, tachycardia, and jitters. Generally, the dosage will vary with the age, condition, sex, and amount of alcohol consumed and can be determined by one of skill in the art.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification be considered as exemplary only, with a true scope and spirit of the invention being indicated by the following claims.

The following description of the embodiment(s) is merely exemplary in nature and is in no way intended to limit the invention, its application, or uses.

In an embodiment of the present invention, an edible composition is provided. The composition includes an edible fluid and a combination of the following: alkaloids, amino acids, plant extracts, polyphenols, sugars, electrolytes, vitamins, organic compounds, at least one preservative, and at least one flavorant in a sufficient amount to render the composition palatable. Prior remedies contain only sugar and electrolytes, which address dehydration, loss of electrolytes, and sugar imbalances. The present composition contains additional ingredients to metabolize alcohol faster, such that the alcohol does not remain in the body long enough to break down into its toxic byproduct—acetylaldehyde—and hangover symptoms can thus be avoided. A plurality of these compounds is required because all work in synergy to target separate effects caused by excessive alcohol.

The present composition consists of a plurality of alkaloids, including but not limited to the following: p-synephrine; N,N-dimethyltyramine (Hordenine); N-methyl-tyramine; methylxanthine. The plurality of alkaloids stimulate the liver to increase its function. Alcohol is broken down in the liver, and when the liver is stimulated, it works harder, leading to faster breakdown of alcohol.

It consists of a plurality of amino acids, including but not limited to the following: L-theanine; branch chain amino acids; N-acetyl tyrosine; 5-hydroxytryptophan; N-acetyl cysteine; acetyl L carnitine. The plurality of amino acids metabolize alcohol faster, since amino acids are substrates for alcohol metabolism.

It consists a plurality of plant extracts, including but not limited to the following: yohimbine HCL; vinpocetine. Plant extracts increase cognitive function, mental clarity, and alcohol metabolism.

It consists of a plurality of polyphenols, including but not limited to the following: green tea extract (45% Epigallocatechin gallate); quercetin dehydrate. Polyphenols are included to increase cognition and energy, and protect against oxidative damage of alcohol.

It consists of sugars, including but not limited to the following: maltodextrin. Alcohol also inhibits production of sugar in the liver, leading to hypoglycemia and headaches; sugars are included to replace those lost from to lack of production in the liver due to the alcohol.

It consists of electrolytes, including but not limited to the following: magnesium glycinate. Alcohol is a diuretic, leading to increased urine output thus loss of electrolytes, and dehydration; electrolytes are included to replace those lost.

It also includes vitamins, including but not limited to vitamin B complex, which increases mental acuity, alcohol metabolism and liver support. The composition further includes the organic compound dimethylethanolamine (DMAE), which increases focus, cognition, and mental clarity, and protects the brain against oxidative damage of alcohol. It includes at least one flavorant in a sufficient amount to render the composition palatable; and at least one preservative.

A variation of this embodiment contains one or more of the following alkaloids: p-synephrine (Synephrine), a naturally occurring alkaloid used for neurostimulation, mental clarity and alcohol metabolism; N,N-dimethyltyramine (Hordenine), a naturally occurring pehethylamine alkaloid also used for neurostimulation, mental clarity and alcohol metabolism; N-methyl Tyramine, a naturally occurring phenethylamine alkaloid used for neurostimulation, mental clarity, and alcohol metabolism; and methylxanthine (caffeine). For example, one embodiment can contain p-synephrine, N-methyl Tyramine, and methylxanthine, but not N,N-dimethyltyramine. In a refinement of the present embodiment, 50 mg of p-synephrine is used, but it may be present in an amount from about 10 mg to about 75 mg. In a refinement of the present embodiment, 50 mg of N,N-dimethylethanolamine is used, but it may be present in an amount from about 10 mg to about 75 mg. In a refinement of the present embodiment, 50 mg of N-Methyl Tyramine is used, but it may be present in an amount from about 10 mg to about 100 mg. In a refinement of the present embodiment, 350 mg of caffeine is used, but amounts from about 75 mg to about 400 mg may be used.

In a variation of the present invention, the embodiment contains one or more of the following amino acids: L-theanine, a naturally occurring amino acid used as an anxiolytic agent and balances the stimulants and reduces the risk tachycardia and jitters; branch chain amino acids (leucine, isoleucine, and valine), naturally occurring amino acids used to fight fatigue, support the liver, and increase mental clarity; N-acetyl tyrosine, a naturally occurring amino acid used for neurostimulation, mental clarity and alcohol metabolism; 5-hydroxytryptophan (5HTP), a naturally occurring amino acid used for anxiolytic purposes and to provide mental clarity; N-acetyl cysteine, an amino acid used to support the liver, aid in alcohol metabolism and provide antioxidant properties; and acetyl L carnitine, a naturally occurring amino used for neurostimulation, mental clarity and increased alcohol metabolism. In a refinement of the present embodiment, 100 mg of L-theanine is used, but it may be present in an amount from about 50 mg to about 200 mg. In a refinement of the present embodiment, 5,000 mg of branch chain amino acids are used, but these may be present in an amount from about 3,000 mg to about 10,000 mg. In a refinement of the present embodiment, 1,000 mg of N-acetyl tyrosine is used, but it may be present in an amount from about 250 mg to about 3,000 mg. In a refinement of the present embodiment, 15 mg of 5-hydroxytryptophan is used, but it may be present in an amount from about 5 mg to about 75 mg. In a refinement of the present embodiment, 750 mg of N-acetyl cysteine is used, but it may be present in an amount from about 100 mg to about 2,000 mg. In a refinement of the present embodiment, 750 mg of acetyl L carnitine is used, but it may be present in an amount from about 100 mg to about 2,000 mg.

In another variation of the present embodiment, one or more of the following plant extracts are used: yohimbine HCL (yohimbe bark extract), a plant extract used for neurostimulation, mental clarity and alcohol metabolism; vinpocetine (periwinkle plant extract), used to increase cognitive function, metal clarity, and metabolism of alcohol. In a refinement of the present embodiment, 10 mg of yohimbine HCL is used, but this may be used in an amount from about 1 mg to about 30 mg. In a refinement of the present embodiment, 25 mg of vinpocetine is used, but it may be present in an amount from about 5 mg to about 75 mg.

In another variation of the present embodiment, one or more of the following polyphenols are used: green tea extract (45% extracted EGCG, or Epigallocatechin gallate), a polyphenol extracted from the green tea plant used to increase cognition and energy, and used to protect against oxidative damage of alcohol; quercetin dehydrate, a naturally occurring bioflavanoid polyphenol extracted from grapefruit, used to protect against oxidative damage of alcohol. In a preferred embodiment, 75 mg of green tea extract is used, but amounts from about 10 mg to about 1,000 mg may be used. Further, in a preferred embodiment, 250 mg of quercetin dehydrate is used, but amounts from about 100 mg to about 1,000 mg may be used.

In a variation of this embodiment, the maltodextrin used is Fibersol, a digestion-resistant compound used to help absorb and metabolize alcohol. In a refinement of the present embodiment, 2,000 mg of Fibersol is used, but it may be used in amounts from about 500 to about 5,000 mg.

In another variation of the present embodiment, the electrolyte magnesium glycinate is used. Magnesium glycinate is a naturally occurring mineral which restores electrolyte balance and provides anxiolytic properties. In a further refinement, 100 mg of magnesium glycinate is used, but it may be used in an amount from about 50 mg to about 150 mg.

The composition also includes vitamin B Complex (B1, B2, niacin, B6, folic acid, B12, biotin, pantothenic acid, inositol), which is a blend of naturally occurring B-vitamins used for mental acuity, alcohol metabolism and liver support. In a refinement of the present embodiment, 2,000 mg is used, but it may be present in an amount from about 500 mg to about 4,000 mg.

The composition further includes the organic compound dimethylethanolamine (DMAE), which increases focus, cognition, and mental clarity. DMAE also protects the brain against oxidative damage of alcohol. In a preferred embodiment, 100 mg of DMAE is used, but amounts from about 50 mg to about 150 mg may be used.

The composition of the present embodiment includes one or more flavorants and/or sweeteners. Characteristically, a sufficient number of flavorants and/or sweeteners are used so that unpalatable tasting components are masked. In a refinement of the present invention, the flavorants are present in an amount from about 0 g/ml to about 0.008 g/ml. Sucralose is an example of a sweetener that may be used in the present embodiment. In a refinement, sucralose is present in an amount from about 0 to about 0.004 g/ml. 0.00003 g/ml.

The energy composition also includes one or more fruit flavorants. Such fruit flavorants include, but are not limited to lemon lime flavors, orange flavors, berry flavors, high fructose corn syrup, raspberry juice concentrates, berry juice concentrates and the like.

In yet another variation of the present invention, the energy composition further comprises a preservative. In a refinement, the preservative is a natural preservative. Examples of useful preservatives include, but are not limited to, benzoic acid and benzoic acid derivatives such as sodium benzoate, calcium benzoate, potassium benzoate, magnesium benzoate, and combinations thereof; and sorbic acid derivatives such as potassium sorbate. In a refinement, the preservative is present in an amount from about 0 to about 0.01 g/ml. In a refinement, the preservative is present in an amount from about 0.001 to about 0.008 g/ml. In still another refinement, the preservative is present in an amount from about 0.004 to about 0.006 g/ml.

The compositions of the present invention are made by introducing suitable amounts of the ingredients set forth above into a suitable edible liquid. Water is a particularly useful liquid for this purpose. FIG. 1 provides the preferred embodiment of the set of components that may be introduced into such a liquid. The amounts provided in FIG. 1 are particularly useful to form compositions having a total final volume of about 6 ounces to about 8 ounces.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. An edible composition which reduces the effects of a hangover in a human in need thereof consisting of therapeutically effective amounts of p-synephrine; N,N-dimethyltyramine; N-methyl tyramine; methylxanthine; L-theanine; caffeine; N-acetyl tyrosine; 5-hydroxytryptophan; N-acetyl cysteine; acetyl L carnitine; yohimbine bark extract periwinkle extract green tea extract quercetin dehydrate; maltodextrin; magnesium glycinate in an amount from about 50 mg to about 150 mg; vitamin B Complex in an amount from about 500 mg to about 4,000 mg; and dimethylethanolamine in an amount from about 50 mg to about 150 mg.

2. The edible composition of claim 1 wherein p-synephrine is present in an amount from about 10 mg to about 75 mg.

3. The edible composition of claim 1 wherein the N,N-dimethyltyramine is present in an amount from about 10 mg to about 75 mg.

4. The edible composition of claim 1 wherein the N-methyl tyramine is present in an amount from about 10 mg to about 100 mg.

5. The edible composition of claim 1 wherein the methylxanthine is present in an amount from about 75 mg to about 400 mg.

6. The edible composition of claim 1 wherein the L-theanine is present in an amount from about 50 mg to about 200 mg.

7. The edible composition of claim 1 wherein the N-acetyl tyrosine is present in an amount from about 250 mg to about 3,000 mg.

8. The edible composition of claim 1 wherein the 5-hydroxytryptophan is present in an amount from about 5 mg to about 75 mg.

9. The edible composition of claim 1 wherein the N-acetyl cysteine is present in an amount from about 100 mg to about 2,000 mg.

10. The edible composition of claim 1 wherein the acetyl L carnitine is present in an amount from about 100 mg to about 2,000 mg.

11. The edible composition of claim 1 wherein the yohimbine bark extract is present in an amount from about 1 mg to about 30 mg.

12. The edible composition of claim 1 wherein the periwinkle extract is present in an amount from about 5 mg to about 75 mg.

13. The edible composition of claim 1 wherein the green tea extract is present in an amount from about 10 mg to about 1,000 mg.

14. The edible composition of claim 1 wherein the quercetin dehydrate is present in an amount from about 100 mg to about 1,000 mg.

15. The edible composition of claim 1 wherein the maltodextrin is present in an amount from about 500 to about 5,000 mg.

* * * * *